(12) United States Patent
Blair et al.

(10) Patent No.: US 7,889,969 B2
(45) Date of Patent: Feb. 15, 2011

(54) AUDIO FREQUENCY SHIFTING DURING VIDEO TRICK MODES

(75) Inventors: Ronald Lynn Blair, Carmel, IN (US);
Mark Alan Schultz, Carmel, IN (US);
Robert Warren Schmidt, Carmel, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 3134 days.

(21) Appl. No.: 10/087,002

(22) Filed: Mar. 1, 2002

(65) Prior Publication Data
US 2003/0165326 A1 Sep. 4, 2003

(51) Int. Cl.
*H04N 5/91* (2006.01)
(52) U.S. Cl. .......................................... 386/75; 386/68
(58) Field of Classification Search ........................ None
See application file for complete search history.

(56) References Cited

U.S. PATENT DOCUMENTS

| | | | |
|---|---|---|---|
| 4,864,428 A | 9/1989 | Kanamaru | |
| 5,748,585 A | 5/1998 | Tsukamoto et al. | |
| 6,154,603 A | 11/2000 | Willis et al. | |
| 6,658,197 B1 * | 12/2003 | Shimura | 386/68 |
| 6,925,340 B1 * | 8/2005 | Suito et al. | 700/94 |

* cited by examiner

*Primary Examiner*—Peter-Anthony Pappas
*Assistant Examiner*—Heather R Jones
(74) *Attorney, Agent, or Firm*—Robert D. Shedd; Robert B. Levy; Jorge Tony Villabon

(57) ABSTRACT

The invention concerns a method and apparatus for audio content playback during fast forward playback video trick modes. A storage medium reader is provided for reading coded digital data from a storage medium such as a DVD. The coded digital data comprises a video programming and a corresponding audio programming. A decoder decodes from a portion of the digital data comprising the audio programming a plurality of digital audio samples corresponding to a selected portion of the video programming. Subsequently, an audio processor key shifts a playback audio pitch associated with the audio samples to compensate for the higher pitched audio associated with the fast forward video playback mode.

18 Claims, 3 Drawing Sheets

AUDIO FREQUENCY SHIFTING DURING VIDEO TRICK MODES

BACKGROUND OF THE INVENTION

1. Technical Field

The invention concerns improved trick mode playback, and more particularly to improvements in the trick mode playback of an audio content associated with a video segment played back at a faster or slower than normal speed.

2. Description of the Related Art

DVD trick modes can include speedup or slowdown of normal playback to either search for a specific location on the disc or to look at details of a video sequence that would normally be missed at regular speed. Both audio and video trick modes are possible and both are found on DVD players that are commercially available. However, conventional methods for playback of audio at fast or slow speed have proved to be problematic. The advancement of the audio digital signal processors used in currently available products has created the possibility for more sophisticated real-time processing for improved audio trick modes.

One problem with the use of video trick modes concerns the treatment of the corresponding audio content. For example, when a user seeks to speed up or slow down the video images displayed, audio playback will be rendered unnatural or distorted. The audio programming is shifted to higher frequencies when a fast trick mode is used, and to lower frequencies when a slow trick mode is used. A fast trick modes that increases the playback speed by a factor of between about 1.5 to 3 times as compared to normal playback will tend to cause human speech to sound higher in pitch. This higher pitched audio playback can be annoying and in many instances is not intelligible to the listener. Conversely, slow speed trick modes produce a lower frequency wobbling sound that may be understandable but not very acceptable to the listener.

Many commercially available DVD players now include a karaoke processor integrated circuit. These processors offer karaoke features in addition to the basic DVD player functions. Basic features of karaoke processors include voice cancellation, echo, and key control. Voice canceling filters out vocal content, allowing a user to sing along. The echo function slightly modifies a singer's voice to enhance the sound. Key control adjusts the pitch of the music to match the pitch of the singer. Such processors have the potential to be useful in addressing some of the problems encountered when reproducing audio during trick mode operation. Heretofore, however, the processing capabilities of these circuits have not been applied to address the problem of audio associated with video trick mode playback.

To avoid the acoustic oddities resulting from DVD trick modes, conventional DVD players often mute the audio during trick mode replays. However, this is not an entirely satisfactory solution since the audio may be of interest in such modes. Accordingly, it would be advantageous if a DVD player could playback audio in a manner that overcomes the limitations of the prior art and provides an audio trick mode playback that is more useful for the listener.

SUMMARY OF THE INVENTION

The invention concerns a method and apparatus for improved audio content playback during video trick modes. The trick mode can be a playback speed that is faster or slower than normal play speed. The coded digital data comprises video programming with corresponding audio content. A decoder decodes from a portion of the digital data comprising the audio signal a plurality of digital audio samples corresponding to a selected portion of the video programming. Subsequently, an audio processor key shifts a playback audio pitch associated with the audio samples to compensate for the changed pitched audio associated with the trick mode video playback.

According to one aspect of the invention, the decoder drops selected ones of the audio samples at a rate approximately corresponding to a selected trick mode video playback speed of the video programming. A digital to analog converter then generates an audio playback signal corresponding only to a remaining set of the audio samples. The audio samples can be dropped at a rate of approximately one every n samples, where n is equal to the selected trick mode playback speed relative to a normal playback speed. In order to compensate for the dropped audio samples, the audio processor preferably shifts the playback audio pitch by a factor of approximately 1/n.

According to an alternative aspect, the decoder can repeat selected ones of the audio samples at a rate that is inversely proportional to a selected trick mode video playback speed of said video programming. This produces a trick mode set of audio samples. The trick mode audio samples are then provided to the digital to analog converter generating an audio playback signal corresponding to the trick mode set of audio samples. The audio samples can be repeated 1/n times, where n is equal to the selected trick mode playback speed relative to a normal playback speed. In order to compensate for the additional audio samples, the audio processor key shifts the playback audio pitch by a multiplying factor of approximately 1/n.

DETAILED DESCRIPTION

The present invention can be used for performing trick modes in any type of digital video recorded on any suitable digital data storage medium. For convenience, the invention shall be described in the context of a DVD medium utilizing conventional MPEG-1 or MPEG-2 format. However, those skilled in the art will appreciate that the invention is not limited in this regard. The digital data storage medium can comprise any media that is capable of storing substantial amounts of digital data for retrieval and playback at a subsequent time. As used herein, a storage medium can include, but is not limited optical, magnetic and electronic means for storing data. These would include but are not limited to an optical Digital Versatile Disk (DVD), magneto optical disk, magnetic hard disk, or a video CD.

Figure 1:
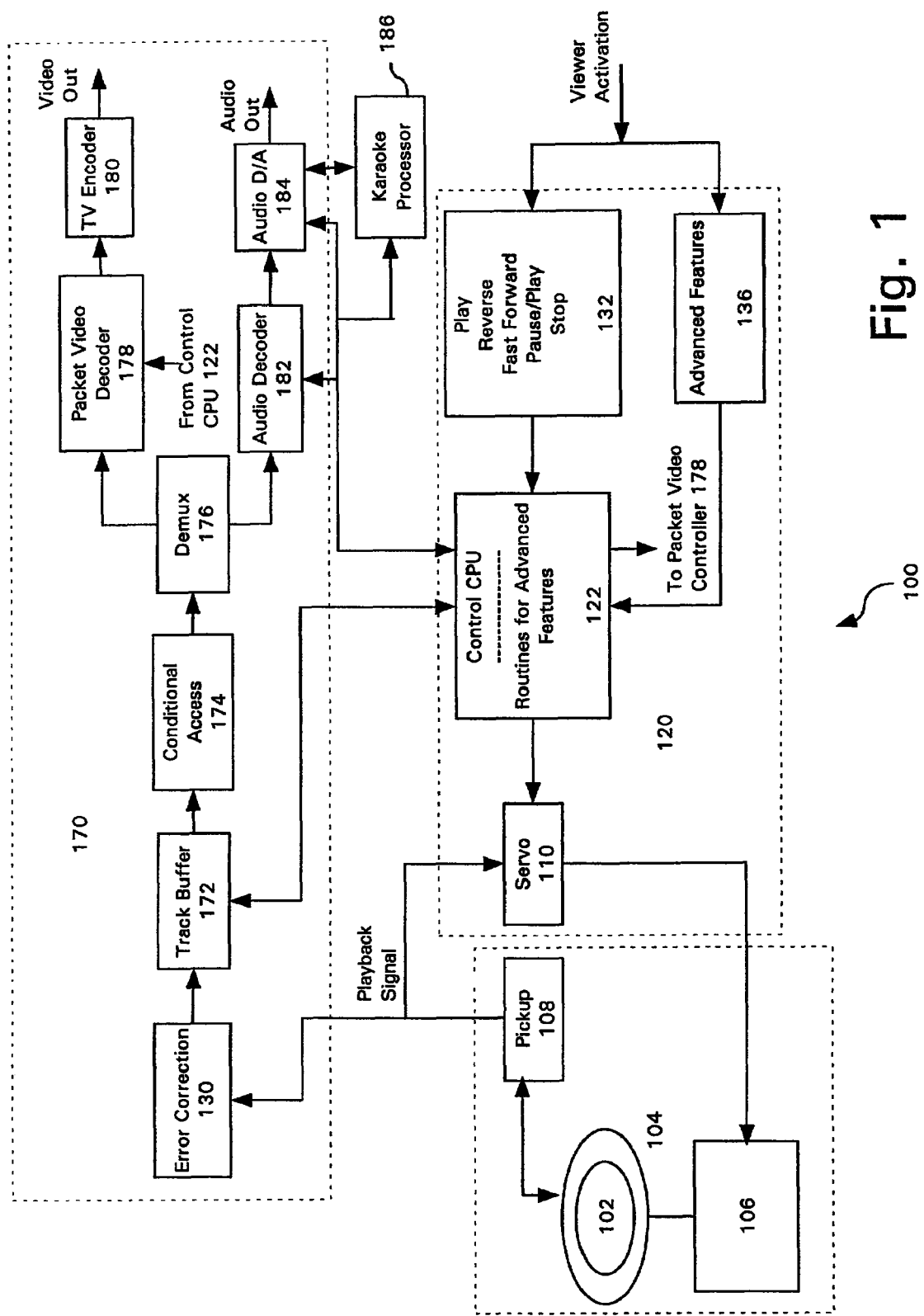
FIG. 1 is a block diagram of a DVD device that can be provided with one or more advance operating features in accordance with the inventive arrangements.

A storage medium reader is provided for reading coded digital data from a digital data storage medium. FIG. 1 is a block diagram of an exemplary DVD video player in which the present invention may be implemented. The device 100 is capable of reading from the disc medium, in this example, a rewritable DVD 102. The device comprises a mechanical assembly 104, a control section 120, and a video/audio output processing path 170. The allocation of most of the blocks to different sections or paths is self-evident, whereas the allocation of some of the blocks is made for purposes of convenience and is not critical to understanding the operation of the device.

The mechanical assembly 104 comprises a motor 106 for spinning the DVD 102 and a pickup assembly 108 adapted to be moved over the spinning disc. A laser on the pickup assembly illuminates data already burned onto the track for playing back video and/or audio program material. For purposes of understanding the invention, it is irrelevant whether the disc is recordable. The pickup and the motor are controlled by a servo 110. The servo 110 also receives the Playback Signal of data read from the spiral track of the disc 102 as a first input. The Playback Signal is also an input to an error correction circuit 130, which can be considered part of the control section or part of the video/audio output processing path.

The control section 120 comprises a control central processing unit (CPU) 122. The servo 110 can also be considered part of the control section. Suitable software or firmware is provided in memory for the conventional operations performed by control CPU 122. In addition, program routines for the advanced features 136 are provided for controlling CPU 122 in accordance with the invention as shall hereinafter be described in greater detail.

A control buffer 132 for viewer activatable functions indicates those functions presently available, namely play, reverse, fast forward, slow play, pause/play and stop. The pause function is a counterpart of the pause operation in a VCR, which for example allows the manual interruption or halting of a play back or recording. A separate buffer 136 can be provided to implement other advanced playback functions, including control over trick mode playback. Such trick mode playback modes can include forward and reverse playback speeds other than standard 1× playback.

The output processing path 170 comprises error correction block 130 and a track buffer, or output buffer, 172, in which data read from the disc is assembled into packets for further processing. The packets are processed by conditional access circuit 174 that controls propagation of the packets through demultiplexer 176 and into respective paths for video and audio processing. The video is decoded by decoder 178, for example from MPEG-1 or MPEG-2, and can be output as video signal components Y, Pr, Pb or encoded to produce a composite television signal, for example NTSC or PAL. The audio is decoded by decoder 182, for example from MPEG-1 or MPEG-2, and converted to analog signal form by audio digital-to-analog (D/A) converter 184.

The player 100 can also preferably include a karaoke processor 186 under the control of CPU 122 for performing audio frequency shifting during video trick modes. Karaoke processor 186 receives from audio decoder 184 digital audio corresponding to a selected video performance that is being played. In standard, non-trick playback modes, the karaoke processor can remain inactive and the audio D/A 184 can process digital audio received from the audio decoder 184. When a trick mode playback has been selected, however, the audio D/A can be configured to receive specially processed digital audio from the karaoke processor.

Karaoke processor 186 can comprise any of a number of commercially available processors that are designed to perform conventional karaoke functions, provided however that the karaoke processor preferably provides at least a key control function. In the karaoke context, this feature is commonly used for adjusting the pitch (or audio frequency) of the music to more closely match the pitch of the singer, without changing the tempo of such music. Integrated circuit processors for performing key control functions are well known. For example, devices such as the M65840FP Digital Key Controller, and M65840SP Digital Key Controller are available from Mitsubishi Electric & Electronics USA, Electronic Device Group, 1050 East Arques Avenue, Sunnyvale, Calif. 94085. Key control processors can operate in the analog or digital domain and either approach can be used with the present invention. Such processors commonly make use of various algorithms and approaches for accomplishing key control. However, the invention is not limited in this regard.

Figure 3:
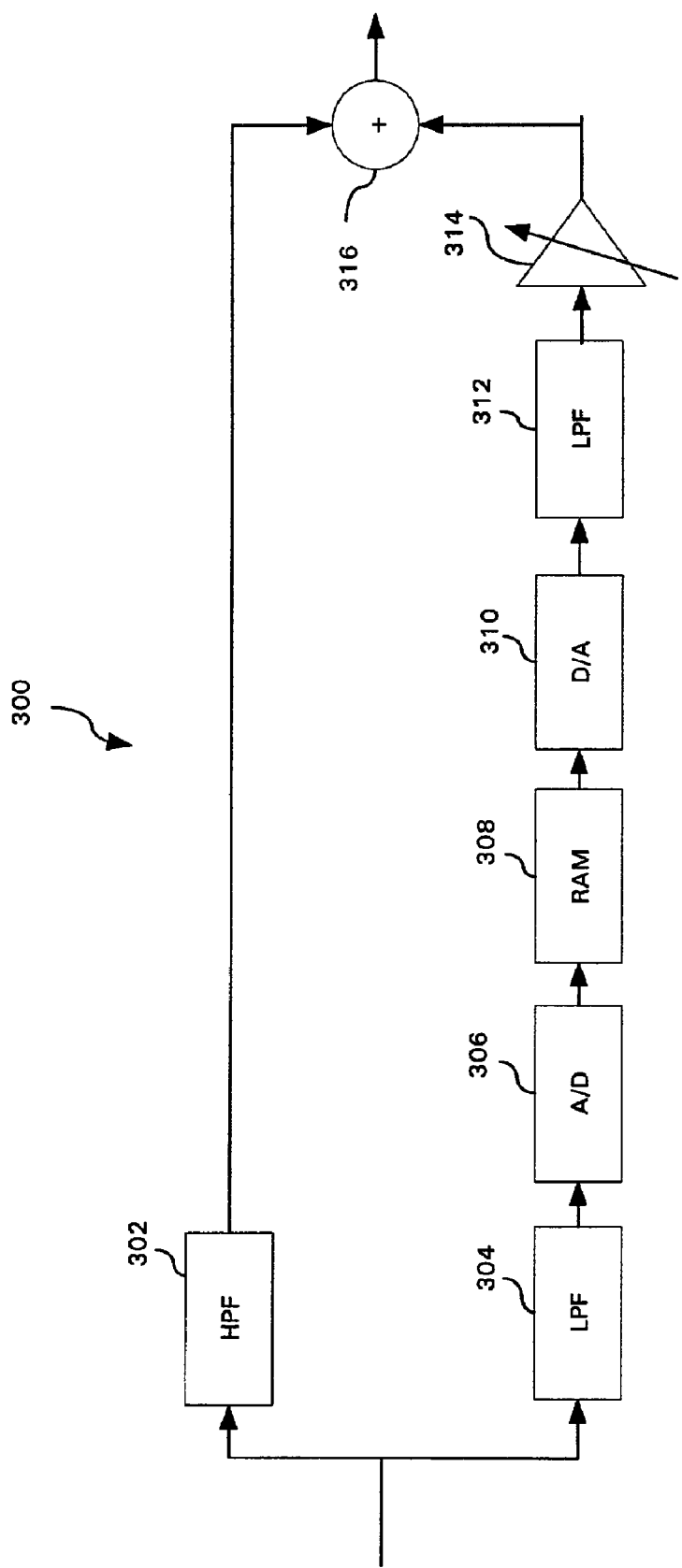
FIG. 3 is a block diagram useful for understanding the operation of key shifting devices.

FIG. 3 is an exemplary block diagram that is useful for understanding the operation of a key control block 300 of karaoke processor 186. As shown in FIG. 3, input audio can be split between high and low pass processing paths established by high pass filter 302 and low pass filter 304. The high pass path processes tempo/beat information whereas the low pass path processes audio voice and accompaniment information. The low pass path is sampled by A/D converter 306 running at a clock rate $F_A$. Clock rate $F_A$ is preferably at least 10× the highest expected input audio frequency. The sampled low pass frequency components are then placed in a memory storage such as RAM 308. Digital-to-analog converter 310 reads data from RAM 308 at a desired output rate $F_B$ where:

$$\text{Key shift} = \log_2(F_B/F_A)$$

For example, if $F_B = 2F_A$, then the pitch is one octave higher. A low pass filter 312 is also provided to remove clock noise and harmonics. A gain adjust unit can also be provided to produce a desired audio output level. Finally, the high and low pass audio signals are summed together in block 316 to provide an output. This approach has been found to work fairly well where the $F_A$ and $F_B$ are much greater than 10× the audio bandwidth.

Those skilled in the art will recognize that the karaoke processor can be designed for operation in the digital or analog domain. If the karaoke processor is of the analog type, it can be configured to receive as its input an analog signal output from D/A converter 184. In that case, the karaoke processor would process the output signal in analog form and would serve as the final stage for audio output from the DVD player 100. However, for the purposes of the present description, player 100 is preferably configured as shown in FIG. 1 so that karaoke processor 186 operates in the digital domain, receiving decoded digital audio from audio decoder 182. The digitally processed audio can then be communicated to D/A 184 for conversion to analog format.

Figure 2:
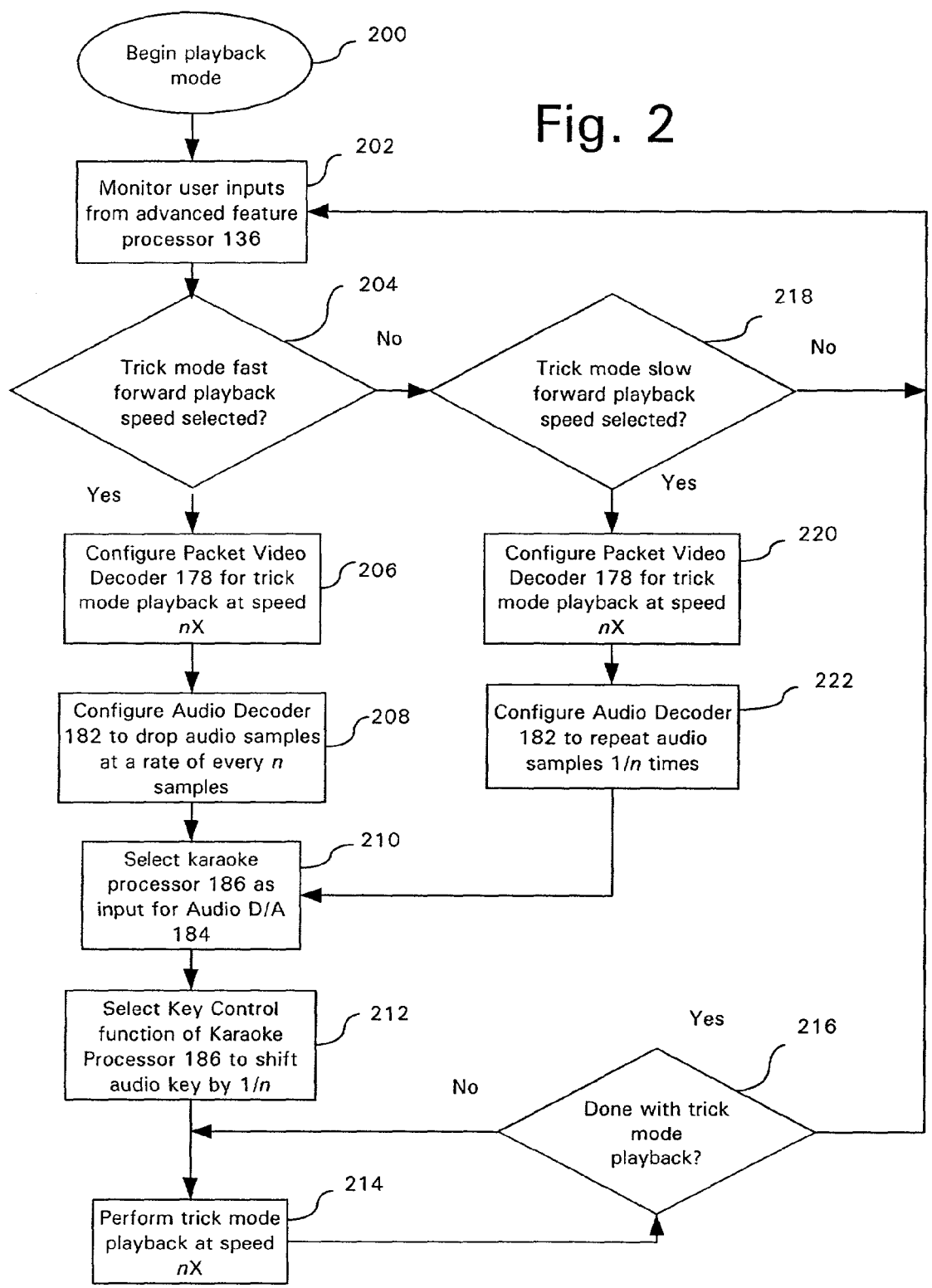
FIG. 2 is a flow chart useful for understanding the process for key shifting trick mode audio.

FIG. 2 is a flowchart that is useful for understanding the inventive arrangements as implemented in an exemplary media player such as device 100. The process in FIG. 2 is described relative to a fast forward playback only since audio playback in reverse trick modes is generally not intelligible or desirable. It should be understood however, that the invention is not so limited. The inventive arrangements as described herein could be applied to reverse playback trick modes using the same techniques as described in FIG. 2.

The process can begin at step 200 when the unit is operated in a playback mode. In step 202, control CPU 122 monitors user inputs from the advanced features buffer 136. In step 204, the control CPU 122 checks to determine whether the trick mode fast forward playback speed is selected. If so, then a trick mode fast forward playback has been selected by the user and the control CPU can continue on to steps 206 through 212 for trick mode playback.

In step 206, the control CPU 122 reconfigures packet video decoder 178 to perform trick mode video playback at speed n× where n is equal to the selected trick mode playback speed relative to a normal playback speed. For example, for a playback speed two times faster than normal, then n=2. There are a variety of ways in which packet video decoder 178 can be configured to provide video playback at faster than normal speeds. For example, the simplest approach would be to cause the packet video decoder to simply drop certain decoded pictures. For example, every other picture to be displayed can be dropped in the case of 2× playback. However, it will be appreciated that other approaches can also be used to alter the video playback speed and the invention is not limited to any particular method of implementing a faster than normal video playback.

In step 208, the control CPU 122 can configure the audio decoder 182 to drop audio samples at a rate of every n samples. Dropping audio samples in this manner has the advantageous effect of speeding up the audio to match the speed of the video. However, if the remaining audio samples were simply passed to the audio D/A 184 for subsequent conversion to analog format, then the result would be a key shift in the audio by a factor of n. This key shift will cause voices to be high pitched and difficult to understand. Accordingly, the digital audio output from the audio decoder 182 can be pre-processed in karaoke processor 186. Accordingly, in step 210, the control CPU advantageously selects the karaoke processor 186 as the input for audio D/A 184. The karaoke processor receives digitized audio from the audio decoder 182 and pre-processes such audio for more natural sound.

In step 212 the control CPU 122 can selectively configure the key control function of karaoke processor 186 to shift the audio key or frequency by 1/n. In particular, by utilizing the key control function of the karaoke processor, the key or pitch of the digitized audio can be shifted down by a factor 1/n to compensate for the selective elimination of every n audio samples in the audio decoder 182. Moreover, since the karaoke processor preferably shifts the audio pitch without altering the tempo or rate of the audio, spoken words associated with the video presentation will be played back more rapidly due to the selective elimination of audio samples but will have a relatively normal pitch.

In step 214, the trick mode playback is performed with the player 100 configured as described. In step 216, the control CPU 122 periodically checks advanced feature processor 136 to determine whether fast forward playback mode has been terminated. If it has not, then the control CPU 100 returns to step 214 and continues trick mode playback. If the user has commanded that the trick mode playback be discontinued, then the process returns to step 202.

In step 204, if control CPU 122 determines that trick mode fast forward playback speed has not been selected, then it proceeds to step 218. In step 218, the control CPU checks to see if a slow forward playback speed has been selected. If so, then in step 220 the control CPU configures packet video decoder 178 for trick mode playback at a speed n×. Note that in this case, n will be a fractional value, for example ½, indicating that playback is to proceed at one half the normal speed. In step 222, the audio decoder 182 is configured to repeat each audio sample 1/n times. In the case where n is ½, each audio sample will be repeated two times. The process then continues on to step 210 as already described above.

Notably, the present invention can be realized in hardware, software, or a combination of hardware and software. Machine readable storage according to the present invention can be realized in a centralized fashion in one computer system, for example the control CPU 122, or in a distributed fashion where different elements are spread across several interconnected computer systems. Any kind of computer system or other apparatus adapted for carrying out the methods described herein is acceptable.

Specifically, although the present invention as described herein contemplates the control CPU 122 of FIG. 1, a typical combination of hardware and software could be a general purpose computer system with a computer program that, when being loaded and executed, controls the computer system and a DVD player system similar to that shown in FIG. 1 such that it carries out the methods described herein. The present invention can also be embedded in a computer program product which comprises all the features enabling the implementation of the methods described herein, and which when loaded in a computer system is able to carry out these methods.

A computer program in the present context can mean any expression, in any language, code or notation, of a set of instructions intended to cause a system having an information processing capability to perform a particular function either directly or after either or both of the following: (a) conversion to another language, code or notation; and (b) reproduction in a different material form.

The invention disclosed herein can be a method embedded in a computer program which can be implemented by a programmer using commercially available development tools for operating systems compatible with the control CPU 122 described above.

What is claimed is:

1. A method for audio content playback during video trick mode playback, comprising:
   reading coded digital data from a storage medium, said coded digital data comprising a video programming and corresponding audio programming;
   decoding from a portion of said digital data comprising said audio programming a plurality of digital audio samples corresponding to a selected portion of the video programming;
   repeating or drooping selected ones of said digital audio samples at a rate corresponding to a selected trick mode video playback speed of said video programming; and
   key shifting a playback audio pitch associated with said audio samples to compensate for said trick mode playback.

2. The method according to claim 1, further comprising generating an audio playback signal corresponding only to a remaining set of said audio samples.

3. The method according to claim 2, wherein said audio samples are dropped at a rate of every n samples, where n is equal to the selected trick mode playback speed relative to a normal playback speed.

4. The method according to claim 3, wherein said key shifting step further comprises shifting said playback audio pitch by a factor of approximately 1/n.

5. The method according to claim 1, further comprising repeating selected ones of said audio samples at a rate inversely proportional to a selected trick mode video playback speed of said video programming to produce a trick mode set of audio samples; and
   generating an audio playback signal (217) corresponding to said trick mode set of said audio samples.

6. The method according to claim 5, wherein said audio samples are repeated 1/n times, where n is equal to the selected trick mode playback speed relative to a normal playback speed.

7. The method according to claim 6, wherein said key shifting step further comprises shifting said playback audio pitch by a multiplying factor of approximately 1/n.

8. The method according to claim 1 wherein said storage medium (102) is selected from a group consisting of a DVD, a magnetic hard disk, magneto optical disk and a video CD.

9. The method according to claim 1, wherein said coded digital data is an MPEG format and said reading step further comprises decoding (215) an MPEG bit stream to obtain said audio samples.

10. Hardware apparatus for audio signal playback during video trick mode playback, comprising:
a storage medium reader for reading a coded digital data from a storage medium, said coded digital data comprising a video signal and a corresponding audio signal;
a decoder for decoding from a portion of said digital data comprising said audio signal a plurality of digital audio samples corresponding to a selected portion of the video signal and for repeating or dropping selected ones of said digital audio samples at a rate corresponding to a selected trick mode video playback speed of said video presentation; and
an audio processor for key shifting a playback audio pitch associated with said audio samples to compensate for said trick mode playback.

11. The hardware apparatus according to claim 10, further comprising
a digital to analog converter generating an audio playback signal corresponding only to a remaining set of said audio samples.

12. The hardware apparatus according to claim 11, wherein said audio samples are dropped at a rate of every n samples, where n is equal to the selected trick mode playback speed relative to a normal playback speed.

13. The hardware apparatus according to claim 12 wherein said audio processor shifts said playback audio pitch by a factor of approximately 1/n.

14. The hardware apparatus according to claim 10, wherein said decoder repeats selected ones of said audio samples at a rate inversely proportional to a selected trick mode video playback speed of said video presentation to produce a trick mode set of audio samples; and
a digital to analog converter generating an audio playback signal corresponding to said trick mode set of said audio samples.

15. The hardware apparatus according to claim 14 wherein said audio samples are repeated 1/n times, where n is equal to the selected trick mode playback speed relative to a normal playback speed.

16. The hardware apparatus according to claim 15 wherein said audio processor shifts said playback audio pitch by a multiplying factor of approximately 1/n.

17. The hardware apparatus according to claim 10 wherein said storage medium is selected from the group consisting of a DVD, a magnetic hard disk, magneto optical and a video CD.

18. The hardware apparatus according to claim 10 wherein said coded digital data is arranged in an MPEG format and said storage medium reader decodes an MPEG bit stream to obtain said audio samples.

* * * * *